Feb. 23, 1965    V. G. SOYKO    3,170,580
VEHICLE LOADING DEVICE
Filed May 21, 1962    2 Sheets-Sheet 1
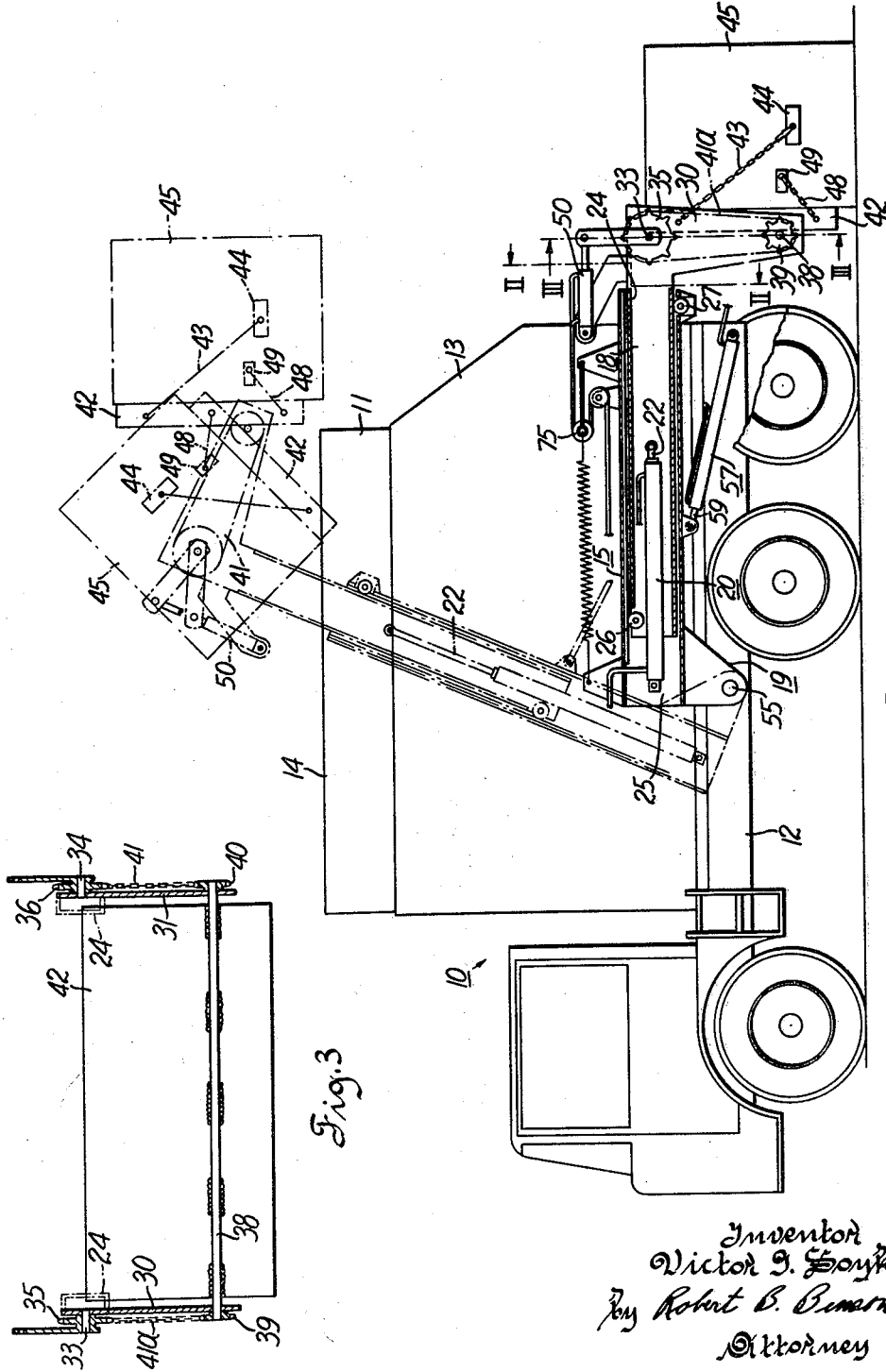
Inventor
Victor G. Soyko
By Robert B. Benson
Attorney Feb. 23, 1965  V. G. SOYKO  3,170,580
VEHICLE LOADING DEVICE
Filed May 21, 1962  2 Sheets-Sheet 2
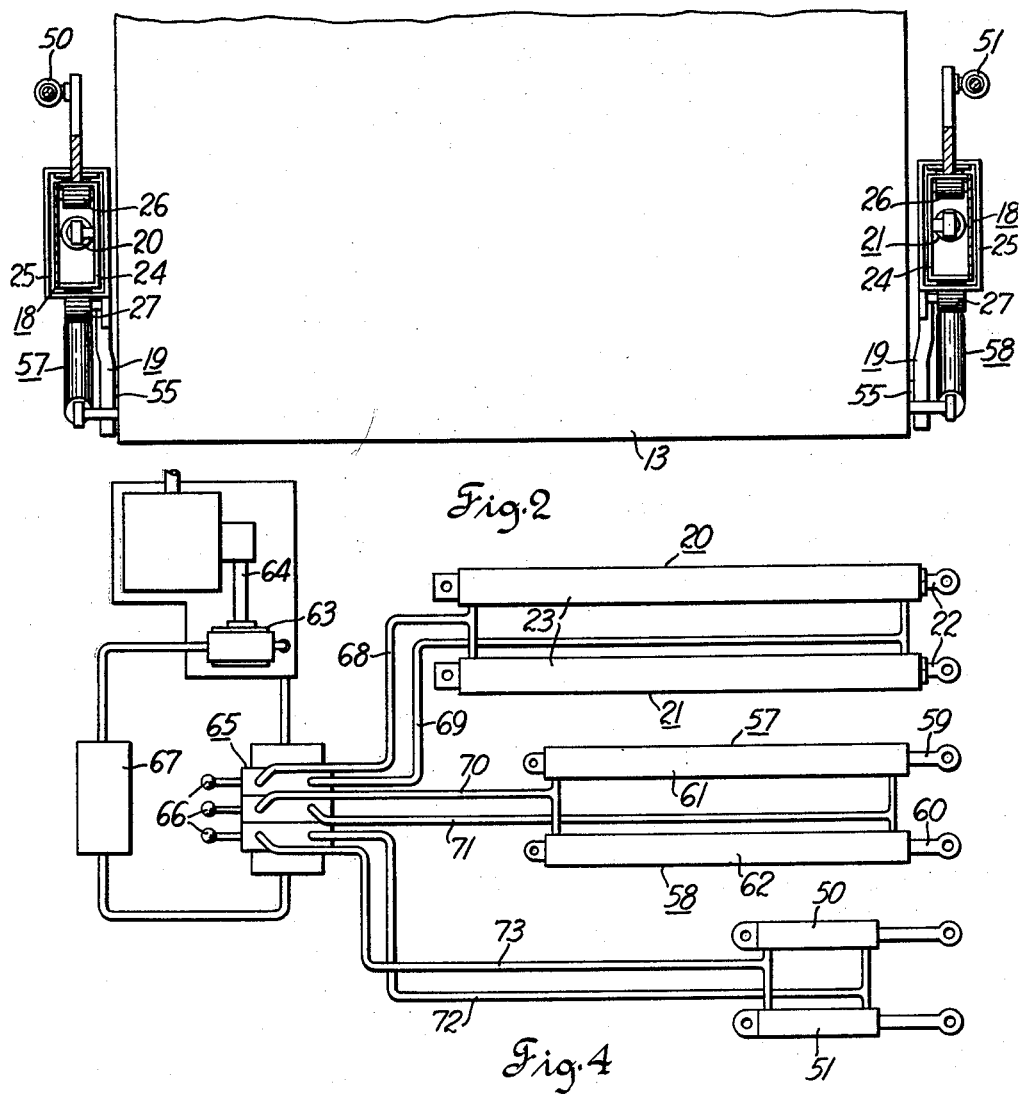
Inventor
Victor G. Soyko
By Robert B. Benson
Attorney

3,170,580
VEHICLE LOADING DEVICE
Victor G. Soyko, 10833 W. Rockne Ave.,
Hales Corners, Wis.
Filed May 21, 1962, Ser. No. 196,193
2 Claims. (Cl. 214—302)

This invention relates generally to loading devices for vehicles. More specifically this invention relates to a hydraulic rear end loader for trucks.

The loading device or hoist of this invention has particularly application in connection with dumping trash or other contents from a separate refuse container. These containers are usually separate boxes that are located in an area where they are easily accessible to the source of the trash. For example the box may be positioned next to a stamping machine or near a group of machine tools. Furthermore, the boxes are also useful in places such as scrap iron yards where the scrap or trash is loaded into the box by a crane or a crane operated electromagnet.

A problem arises when an attempt is made to remove the trash boxes. Because of the relatively inaccessible location of the trash boxes and the fact that they are usually surrounded by scraps of iron, steel and other sharp objects, loading trucks often can not get close enough to the box for loading and if they do they frequently get scraps of metal in their tires which cause blowouts and excessive wear on the tires.

The hoist of this invention overcomes the above problems by providing arms that are extendable horizontally away from the truck to engage and lift the trash container. These arms are attached to a lift frame that can be rotated relative to the truck body. In addition, a hydraulic ram or other suitable means are provided to pivot the container to dump the load. Furthermore, the position of the adjustable arms can be varied to aid in uniformly distributing the load in the truck body.

By utilizing the horizontally movable arms of this invention, the loading device can be designed to ride closer to the end of the truck. In fact, it could be designed to be withdrawn past the end of the truck into a special space so as not to extend beyond the end of the truck when the truck is moving. Furthermore the extendable arms allows the operator to place the load at a higher position relative to the truck body before dumping. This permits the use of higher side boards on the truck with a resulting increase in the size of pay load the truck can carry. Another advantage of the extendable arms is that boxes can be lifted over the tail gate and set down within the truck body without tipping or dumping the box.

The combination of the extendable arms and the pivoting motion of the lift frame allows the operator to vary the position of the trash box relative to the body before dumping. This makes it possible to more uniformly distribute the load in the truck body.

Therefore it is the object of this invention to provide a new and improved trash loading device for vehicles.

Another object of this invention is to provide a new and improved trash loading device that has means for more easily reaching the load to be lifted and dumped.

Another object of this invention is to provide a trash loading device that more uniformly distributes the load in the truck body.

Other objects and advantages of this invention will be apparent from the following description when read in connection with the accompanying drawings, in which:

FIG. 1 is a side view of a truck having the trash loading device of this invention and showing the dumping position of the loading device in dotted lines;

FIG. 2 is a cross sectional view taken along the line II—II of FIG. 1, showing the horizontally movable arms;

FIG. 3 is a cross sectional view taken along the line III—III of FIG. 1 showing the lifting plate;

FIG. 4 is a diagrammatical view of the hydraulic rams and circuits used with the loader of this invention.

Referring more specifically to the drawings by characters of reference the invention is illustrated in connection with a dump truck 10 having a chassis 12, a body 13 which opens at the top 14. The body may be provided with extra high side board such as shown at 11. A suitable loading device 15 is mounted on the body 13 and is rotatable relative thereto.

The loading device 15 comprises a pair of fork arms 18 positioned on either side of the truck and mounted on the lifting frame 19. These arms 18 are adapted to be movably axially toward and away from the truck body 13. Accordingly, the arms 18 are operatively connected to a pair of hydraulic rams 20, 21.

Two sets of double acting rams are preferably provided for each operating function. One of each set of rams is located on each side of the truck to evenly distribute the load to be moved by the rams.

As shown in the drawing, the arms 18 are preferably constructed of a channel member 24 that telescopes into a second and slightly larger channel member 25. Suitable rollers 26 and 27 are located between the channels to facilitate relative movement between the channel members. The pistons 22 of rams 20, 21 are connected to channels 24 and the cylinders 23 are connected to channels 25.

The outer ends of the arms 18 are connected to vertical struts 30, 31 as shown in FIGS. 1 and 3. A pair of shafts 33, 34 are connected to the outer ends of arms 18 and the struts 30, 31. Sprocket wheels 35, 36 are rotatably mounted on shafts 33, 34 respectively. A single shaft 38 extends between the struts 30, 31 at the lower ends of the struts. Sprocket wheels 39, 40 are mounted on the extended ends of the shaft 38 for rotating the shaft. The wheels 39, 40 combine with the wheels 35, 36 to form a pair of chain drives 41, 41a for rotating the shaft 38. Preferably the upper wheels have twice as many teeth as the lower wheels to provide a two to one ratio for the drive. This provides twice as much rotary movement of the lower wheels relative to the upper wheels. Therefore a ram having a much shorter stroke can be used with the upper wheel to actuate the dumping operation.

Fixedly attached to the lower shaft 38 and extending between the struts is a suitable platform-like support 42. The support 42 is provided with grips for engaging and lifting the trash boxes. Preferably a pair of heavy chains 43 are connected to the upper part of the support and extend outward to engage a handle 44 at the lower part of the trash box 45. During the lifting operation the box 45 is tipped slightly and lies flat against the support 42. A second and much lighter pair of chains 48 extends from the bottom of the support 42 slightly upward to a second handle 49 on the box 45. This chain is used to prevent the box from falling off the support when the box is in the dumped position as shown at the top of FIG. 1.

The upper wheels 35, 36 are connected to a second set of hydraulic rams 50, 51 for actuating the chain drive 41 and thereby pivot the platform 42 and hence the trash box 45. The chain and sprocket drives 41, 41a give a close control of the dumping operation and can be designed with a favorable mechanical advantage to relieve the amount of force required by the hydraulic rams 50, 51 to pivot the trash box. Furthermore, the drives can be used to keep the trash boxes level during lifting to prevent spilling of the trash during the lifting operation.

The lifting frame 19 is mounted on dowels 55 which are in turn attached to the frame or body 13 of the truck. The lifting frame 19 is also connected to a pair of hydraulic rams 57, 58 which rotate the frame around the dowels 55. As shown in FIG. 1 the frame 19 is mounted on the body 13 and to the pistons 59, 60 of rams 57, 58, respectively. The cylinders 61, 62 of rams 57, 58 are connected to the body 13 of the truck. Hence the pressure of the rams forces the lifting frame 19 to move relative to the body of the truck and hence rotate it about the dowels 55. In the usual operation, the lifting frame 19 is rotated approximately 90 degrees to place the refuse containers 45 above the truck body 13 and the extendable arms 18 in a substantially vertical position. However, when spreading the load in the truck body, the frame 19 may be rotated slightly more or less than 90 degrees to dump the load in a more desirable location within the body.

The refuse in the trash box 45 tends to flow into the truck body at the same angle that the side of the container makes with the floor of the truck body. Hence by varying the height and angular position of the container 45 above the truck body, the operator can vary the places where the trash will be piled. Therefore, the rams 57, 58 can be operated to change the vertical position of the arms 18 and hence the position of the container 45 above the body 13 before dumping. Also the rams 50, 51 can be operated to vary the angular position of the trash container 45 relative to the body before dumping.

FIG. 3 illustrates schematically the hydraulic circuit for the trash loader of this invention. The circuit comprises a pump 63 adapted to be driven by a power take off 64 which in turn is driven by the truck transmission. A master control valve 65 is provided for selectively directing the hydraulic fluid to one or more of the hydraulic rams. Control levers 66 are connected to the master valve and are located to be easily accessible to the operator. A reserve tank 67 is connected in the hydraulic circuit to take care of minor leaks of the hydraulic fluid and to prevent excessive heating of the fluid during very heavy loading cycles. Specifically, the rams 20, 21 are connected to the master valve by flexible conduits 68, 69: the rams 57, 58 are connected to a different portion of the master control valve by flexible conduits 70, 71 and the rams 50, 51 are connected to a third section of the master control valve by flexible conduits 72, 73. The conduits are usually high pressure, steel reinforced rubber hose. Because of the length of travel of the rams, suitable spring and pulley arrangements can be provided for the hoses to keep them from sagging into the operating mechanism of the rams during the short portion of their stroke. Such a pulley and spring arrangement is illustrated at 75.

In operation the truck is backed into the area where the loaded trash box or container 45 is placed. The extension rams 20, 21 are actuated to move the arms 18 horizontally outward toward the container. The chains 43, 48 on the platform 42 are then connected to the handles 44, 49 of the container. Now that the box is ready for loading the rams 20, 21 are reversed to draw the box inward toward the truck. Rams 50, 51 are operated slightly to actuate the chain drives 41, 41a to pivot the box 45 back against the support 42. The rams 57, 58 are then operated to rotate the frame 19 to position the arms 18 and box 45 above the truck body. During the rotation of frame 19, the rams 50, 51 are operated to maintain the box 45 in a level position and thereby avoid accidental spilling of trash from the box 45. The extension rams 20, 21 may be actuated to position the box in a higher vertical position before dumping. The exact angular position of the arms 18 is determined by where the operator wants to dump the load in the body and hence he stops the movement of rams 57, 58 accordingly. The rams 50, 51 are then actuated to pivot the platform 42 and hence the trash box 45 and thereby dump the load into the truck body. As mentioned above by properly determining the position of the box before dumping, the operator can obtain a substantially uniform distribution of the trash in the body.

Although but one embodiment of the invention has been illustrated and described, it will be apparent that various changes and modifications can be made therein without departing from the spirit of the invention or the scope of the appended claims.

It is claimed:

1. The combination of a vehicle having a substantially fully open top truck body and a hoisting mechanism comprising: a lifting frame mounted on the sides of said truck body for pivotal movement about horizontal transverse axis disposed substantially midway fore and aft of said truck body, a pair of arms slidably disposed within said frame, hydraulic means connected to said frame and said arms for moving said arms telescopically along said frame for extension and retraction of said arms relative to said frame, a vertically disposed support member pivotally connected to the outer ends of said arms, said support member having means for engaging a trash box, hydraulic means connected to said frame and said truck body for rotating said frame relative to said body to position said support member above said truck body whereby material from the trash box can be distributed over the entire length of the truck body, and hydraulic means operatively connected to said support member for pivoting said support member relative to said arms to dump the load from the trash box into said truck body.

2. The combination of claim 1 in which the support member comprises a platform extending between the outer ends of said arms and being pivotally connected thereto, a first pair of chains connected to the sides of said platform above the midpoint and adapted to extend and engage a trash box below its midpoint, and a second set of chains connected to the sides of said platform below the midpoint and adapted to engage the trash box and hold it against said platform while it is being lifted and dumped.

References Cited by the Examiner

UNITED STATES PATENTS

| | | | |
|---|---|---|---|
| 2,480,959 | 9/49 | Presnell | 214—78 |
| 2,624,478 | 1/53 | Kaplan | 214—78 |
| 2,808,161 | 10/57 | Gentile | 214—302 |
| 2,815,138 | 12/57 | Noffsinger | 214—140 |
| 2,908,411 | 10/59 | Ambarcumian | 214—302 |
| 2,933,210 | 4/60 | Dye | 214—651 X |
| 3,016,157 | 1/62 | Brisson | 214—302 |
| 3,042,234 | 7/62 | Davis | 214—141 |
| 3,047,160 | 7/62 | Paul | 212—55 X |
| 3,083,849 | 4/63 | Mottin | 214—302 |
| 3,140,788 | 7/64 | Clar | 214—302 |

FOREIGN PATENTS 1,019,903  1/53  France.

HUGO O. SCHULZ, *Primary Examiner.*

GERALD M. FORLENZA, *Examiner.*